Figure 1:
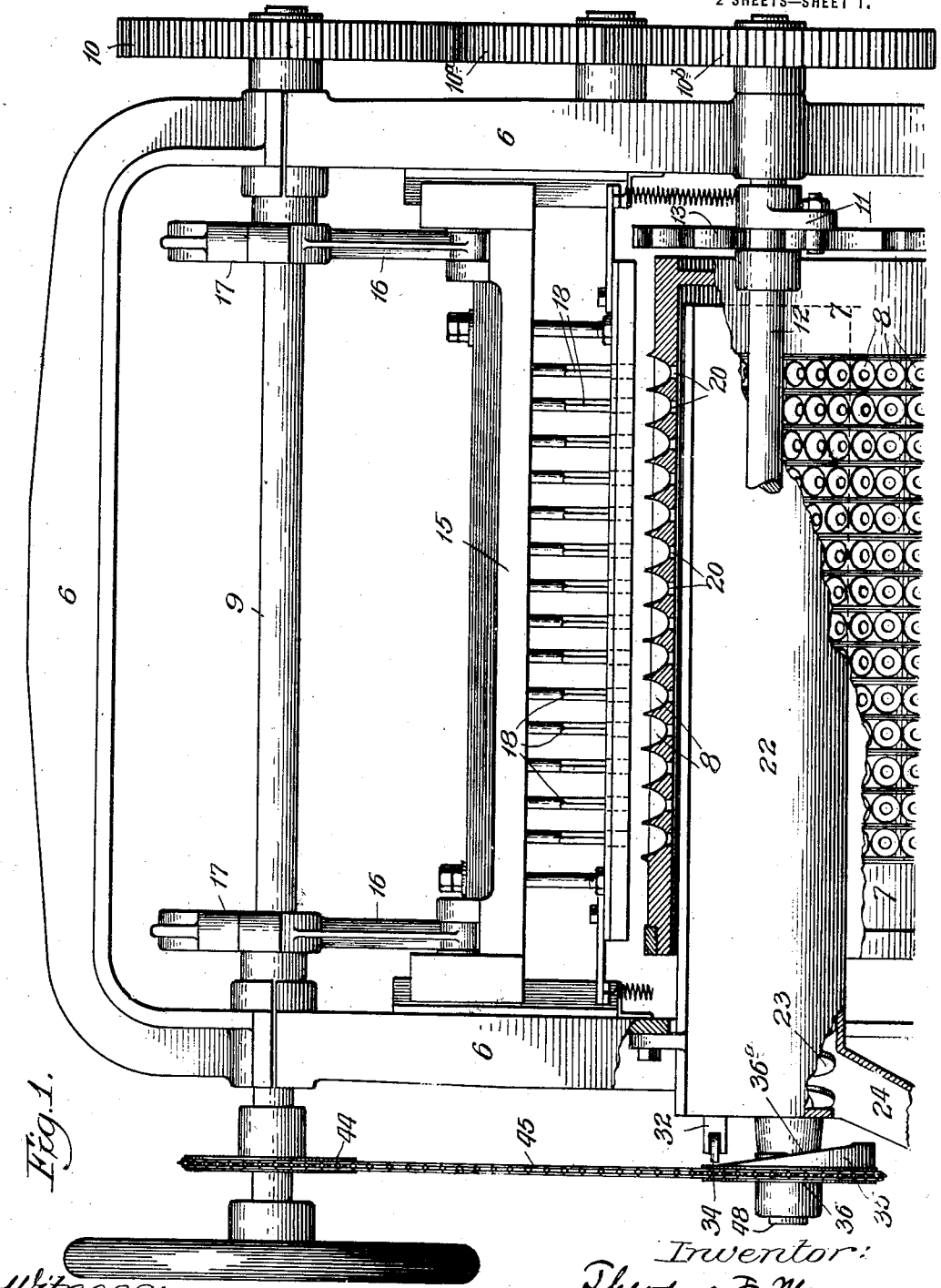

T. F. MORSE.
CHERRY PITTER.
APPLICATION FILED JAN. 7, 1920.

1,336,852.

Patented Apr. 13, 1920.
2 SHEETS—SHEET 1.

Witness:
John Enders

Inventor:
Theodore F. Morse
by Fred Gerlach
his Atty.

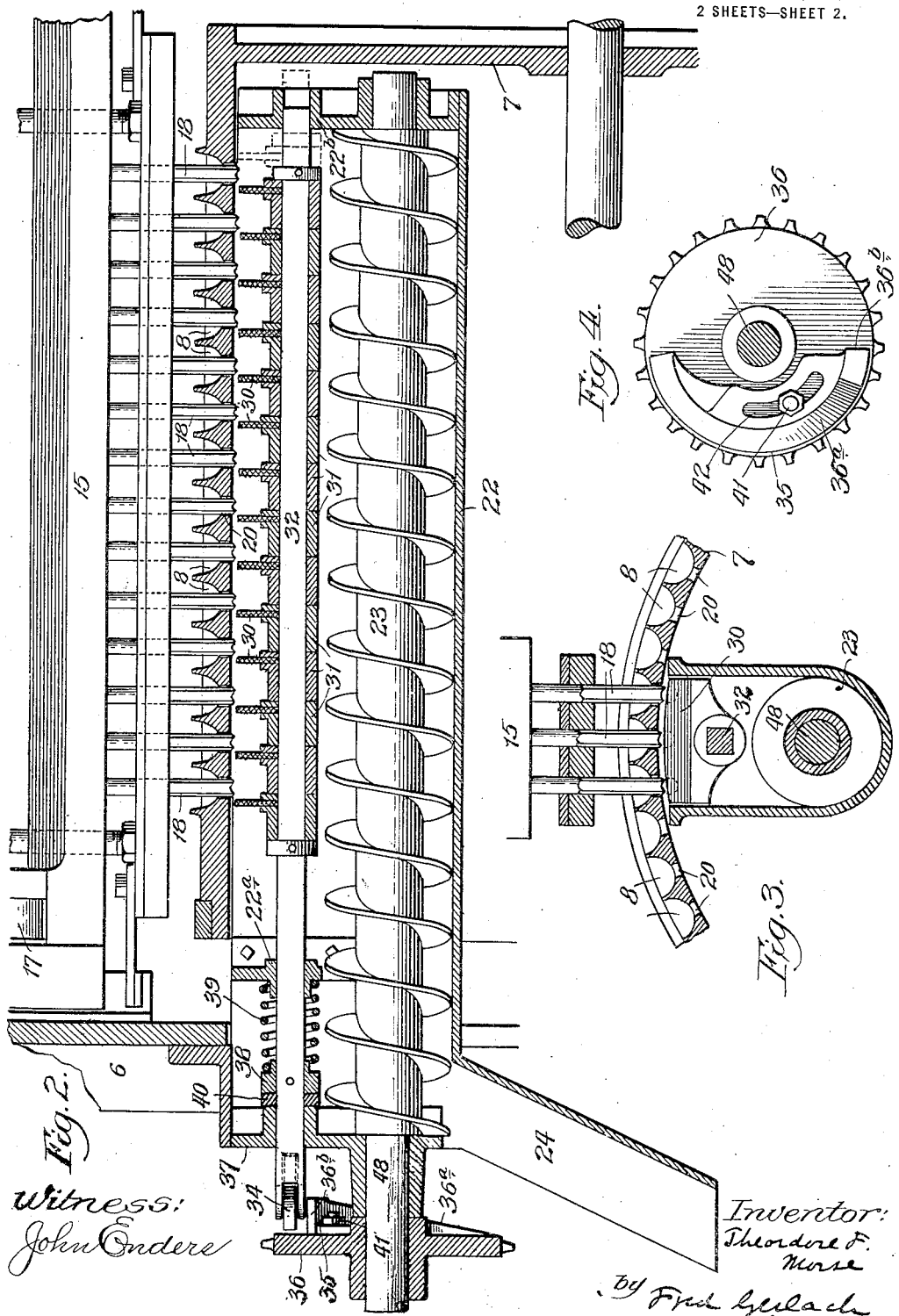

UNITED STATES PATENT OFFICE.

THEODORE F. MORSE, OF SILVER CREEK, NEW YORK, ASSIGNOR TO HUNTLEY MANUFACTURING CO., OF SILVER CREEK, NEW YORK, A CORPORATION OF NEW YORK.

CHERRY-PITTER.

1,336,852.  Specification of Letters Patent.  Patented Apr. 13, 1920.

Application filed January 7, 1920. Serial No. 349,940.

*To all whom it may concern:*

Be it known that I, THEODORE F. MORSE, a citizen of the United States, and a resident of Silver Creek, in the county of Chautauqua and State of New York, have invented certain new and useful Improvements in Cherry-Pitters, of which the following is a full, clear and exact description.

The invention relates to cherry pitters and more particularly to that type in which a rotary drum is used to deliver the cherries or fruit to a reciprocating series of pitter-knives.

The object of the invention is to provide an improved machine in which effective provision is made for removing the pits from the knives while they are extended through the fruit.

Another object of the invention is to provide a cherry-pitter of improved construction.

The invention consists in the several novel features hereinafter set forth and more particularly defined by claims at the conclusion hereof.

In the drawings: Figure 1 is a side elevation of a machine embodying the invention. Fig. 2 is a longitudinal section. Fig. 3 is a section taken on line 3—3 of Fig. 2. Fig. 4 is a detail of the cam for operating the wipers in one direction.

The machine comprises a frame 6 in which is suitably mounted a rotary drum 7 having annular series of cells 8 therein adapted to receive individual cherries. A longitudinal drive-shaft 9 is mounted in the frame 6 and is provided with suitable eccentrics 17 for operating pitmen 16 to reciprocate a vertically slidable cross-head 15 in which the pitter-knives 18 are secured. These knives are adapted to operate through the cells 8 and the cherries therein to remove the pits from the fruit. Preferably, this head carries three rows of pitter-knives 18 to simultaneously pit the fruit in the three rows of fruit cells 8. A shaft 12 is provided with a "Geneva" pinion 11 meshing with a "Geneva" gear 13 on the drum to operate the latter step-by-step or intermittently, as well understood in the art. Drive-shaft 9 also serves to drive shaft 12 by a gear-train comprising a gear 10 fixed to shaft 9 an idler 10$^a$ and a gear 10$^b$ fixed to shaft 12. The mechanism thus far described may be of any suitable construction, as well understood in the art.

The pits removed from the fruit are carried through the openings 20 in the bottoms of the fruit cells 8 to be discharged into a stationary housing 22 which is mounted within the drum and is adapted to receive the pits removed by the knives. A screw-conveyer 23 is adapted to convey the pits in the housing laterally and to discharge them through a chute 24 at one end of the machine.

In practice, it occurs that the pits sometimes adhere to the pitter-knives and the present invention provides improved mechanism for wiping the pits from the knives. This mechanism consists of a series of wipers 30 formed of elastic strips of material, such as rubber. The upper ends of these wipers are extended to the lowermost point of movement of the knives and each wiper is secured to a collar 31. The entire series of collars is mounted on a square rod 32 which is slidable longitudinally and guided in the ends 22$^a$ and 22$^b$ of the housing. Each wiper is wide enough or extends transversely to clean the pits from one knife in each of the three rows.

Normally, the wipers are disposed at one side of the pitter-knives, as shown in Fig. 2. Rod 32 extends through a fixed head 37 and to the outside thereof where it is provided with a roller 34. A collar 38 is fixed to shaft 32 between the heads 22$^a$ and 37. A spring 39 is interposed between collar 38 and head 22$^a$ to normally hold rod 32 so that the wipers carried thereby will be held at one side of the pitter-knives. A rubber cushion 40 is placed between head 37 and collar 38. A cam 35 on a sprocket-wheel 36 is provided with an inclined surface 36$^a$ adapted to operate roller 34 and rod 32 longitudinally to bring the wipers across the axes of the pitter-knives and with an abrupt releasing surface 36$^b$. Sprocket-wheel 36 is driven from shaft 9 by a sprocket 44 on said shaft and a chain 45. This chain-connection causes the cam 35 to be operated in synchronism with the pitter-knives. In order to make it possible to correctly time the release of the wipers by the cam, the latter is adjustably secured to the sprocket-wheel 36 by a bolt 41 and arcuate slot 42. Sprocket-wheel 36 is fixed to the shaft 48 of the screw-conveyer 23, so that the sprocket serves to operate the wiper cam and the screw-conveyer.

In operation, the wipers are normally at rest as shown in Fig. 2. While the pitter-knives are raised, the inclined cam-surface 36ᵃ will operate the rod 32 longitudinally to bring the wipers 30 to the left of the knives, and when the knives have reached their lowermost position, the roller 34 will reach the releasing surface 36ᵇ and the spring 39 will force the wipers to move quickly to the left, causing them to dislodge the pits from the knives so they will drop into the trough 23.

The invention exemplifies wiping mechanism for the pitter-knives in which the movement of the wiper is longitudinal or axial of the drum and which is especially adapted for machines in which there are plural rows of knives, because the knives in all of the rows will be effectively wiped by the transversely extending wipers. When the latter become worn, they can be easily and individually replaced, because an injury to one wiper does not necessitate the replacement of others.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a pitting machine, the combination of a drum having cells therein for the fruit, pitter-knives for removing the pits from the fruit and operating through the cells, a series of wipers movable longitudinally of and in the drum, and means for reciprocating the wipers.

2. In a pitting machine, the combination of a drum having cells therein for the fruit, pitter-knives for removing the pits from the fruit and operating through the cells, a series of wipers movable longitudinally of and in the drum, and means for operating the wipers comprising a spring for imparting the operative stroke to the wipers.

3. In a pitting machine, the combination of a drum having cells therein for the fruit, pitter-knives for removing the pits from the fruit and operating through the cells, a series of wipers movable longitudinally of and in the drum, a spring for imparting the operative stroke to the wipers, and power-driven means for shifting the wipers in reverse direction.

4. In a pitting machine, the combination of a drum having cells therein for the fruit, pitter-knives for removing the pits from the fruit and operating through the cells a series of wipers movable longitudinally of the drum, a spring for shifting the wipers in one direction, and power-driven means for operating the wipers in the other direction, comprising a cam.

5. In a pitting machine, the combination of a drum having cells therein for the fruit, pitter-knives for removing the pits from the fruit and operating through the cells, a series of wipers movable longitudinally of the drum and adjustable means for operating the wipers.

6. In a pitting machine, the combination of a drum having cells therein for the fruit, pitter-knives for removing the pits from the fruit and operating through the cells, mechanism for operating said knives, a series of wipers movable longitudinally of the drum, a trough beneath the wipers, a conveyer in said trough, and means for conjointly operating the wipers and driving said conveyer.

7. In a pitting machine, the combination of a drum having cells therein for the fruit, pitter-knives for removing the pits from the fruit and operating through the cells, mechanism for operating said knives, a series of wipers movable longitudinally of the drum, a trough beneath the wipers, a conveyer in said trough, a wheel driven in synchronism with the pitter-knives, and connected to drive said conveyer, and a cam adjustably connected to said wheel, for operating said wipers.

8. In a pitting machine, the combination of a drum having cells therein for the fruit, pitter-knives for removing the pits from the fruit and operating through the cells, a shaft longitudinally disposed in the drum, a series of collars on said shaft, wipers secured in said collars respectively and means for operating the shaft.

9. In a pitting machine, the combination of a drum having cells therein for the fruit, a cross-head, mechanism for operating the cross-head, plural rows of pitter-knives secured in and operated by the cross-head and adapted to operate through the cells, a series of wipers movable longitudinally of the drum, each wiper being extended to remove the pits from the knives of each of the rows and means for operating the wipers longitudinally of the drum.

10. In a pitting machine, the combination of a drum having cells therein for the fruit, a cross-head, mechanism for operating the cross-head, a shaft longitudinally disposed in the drum, a series of collars on said shaft, wipers secured in the collars respectively and extended transversely to remove the pits from a knife in each of the rows, and means for operating the shaft longitudinally.

THEODORE F. MORSE.